United States Patent

(12) United States Patent
Agusa

(10) Patent No.: US 8,704,098 B2
(45) Date of Patent: Apr. 22, 2014

(54) GROMMET

(75) Inventor: Narihiro Agusa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 108 days.

(21) Appl. No.: 13/503,719

(22) PCT Filed: Jun. 24, 2010

(86) PCT No.: PCT/JP2010/060713
§ 371 (c)(1),
(2), (4) Date: Apr. 24, 2012

(87) PCT Pub. No.: WO2011/061959
PCT Pub. Date: May 26, 2011

(65) Prior Publication Data
US 2012/0217041 A1 Aug. 30, 2012

(30) Foreign Application Priority Data

Nov. 18, 2009 (JP) .................. 2009-263260

(51) Int. Cl.
*H02G 3/22* (2006.01)
(52) U.S. Cl.
USPC ............. 174/152 G; 174/153 G; 174/151; 16/2.2; 248/56
(58) Field of Classification Search
USPC .......... 174/152 G, 153 G, 151; 16/2.1, 2.2; 248/56
See application file for complete search history.

(56) References Cited

U.S. PATENT DOCUMENTS

| 5,123,862 | A | 6/1992 | Suzuki |
| 5,981,877 | A | 11/1999 | Sakata et al. |
| 6,486,400 | B1 * | 11/2002 | Smutny et al. ............... 174/651 |
| 6,708,366 | B2 * | 3/2004 | Ono et al. ...................... 16/2.5 |
| 8,299,364 | B2 * | 10/2012 | Suzuki et al. ............. 174/152 G |

FOREIGN PATENT DOCUMENTS

| DE | 69712837 | 1/2003 |
| DE | 69902505 | 3/2003 |
| JP | 4-5078 | 1/1992 |
| JP | 6-80977 | 11/1994 |
| JP | 10-47548 | 2/1998 |
| JP | 2001-309528 | 11/2001 |
| JP | 2002-359914 | 12/2002 |

OTHER PUBLICATIONS

Germany Office action, mail date is Jun. 3, 2013.

* cited by examiner

*Primary Examiner* — Dhirubhai R Patel
(74) *Attorney, Agent, or Firm* — Greenblum & Bernstein P.L.C.

(57) ABSTRACT

First and second grommets are each positioned in contact with vehicle body panel surfaces through which a wire harness through-hole has been bored. The first and second grommets are each integrally formed from rubber or an elastomer with a small diameter tubular portion, to which a wire harness is adhered, then inserted and fixated by tape-winding, and with a large diameter tubular portion extending from one end of the small diameter tubular portion. One portion of a stud bolt fixatedly inserted into a bolt hole bored in the peripheral rim of the wire harness through-hole on the vehicle body panel and protruding from both surfaces of the vehicle body panel passes through a bolt hole provided on the first grommet and is fixated by a nut, while another portion of the stud bolt passes through a bolt press-fitting hole provided on the second grommet.

4 Claims, 4 Drawing Sheets

GROMMET

FIELD OF THE INVENTION

The present invention relates to a grommet for a vehicle, and specifically a grommet mounted on a wire harness routed in an automobile and mounted in a through-hole of a vehicle body panel, the grommet increasing the sound insulation ability toward a vehicle interior.

BACKGROUND OF THE INVENTION

Conventionally, when inserting a wire harness routed in an automobile into a through-hole of a vehicle body panel, a grommet is externally fitted and attached to a wire harness and the grommet into which the wire harness is inserted is mounted in a through-hole of the vehicle body panel. Thereby, the portion of the wire harness inserted in the through-hole is protected from water and dust.

In this kind of grommet, there are many cases in which a peripheral edge of the through-hole of the vehicle body panel is fitted to an annular groove portion provided on an outer periphery of the grommet; however, as shown in FIG. 5, there are also cases in which a bolt 5 fixated on a peripheral edge of a through-hole 4 which has been bored in a vehicle body panel 3 is inserted into a bolt hole 2 provided on a grommet 1, and then the grommet 1 is adhered to the vehicle body panel 3 and is fastened and fixated by the bolt 5 and a nut (not pictured) (see Japanese Patent Laid-open Publication No. 2001-309528). Even when the grommet is attached to the vehicle body panel by bolt fastening in this way, it is possible to improve the stability of the adhered state between the grommet and the vehicle body panel, and to maintain waterproofing and debris-proofing functions of the grommet.

In this kind of grommet for a vehicle, in addition to waterproofing and debris-proofing performance, sound insulation performance which stops noise of the engine compartment and the like from leaking into a vehicle cab side through the through-hole has also been fiercely sought after. In many conventionally supplied grommets having high sound insulation ability, a portion of the grommet disposed outside a vehicle cab has a two-walled structure having interior and exterior walls, and has included a sealed space for sound insulation between the interior and exterior walls. In addition, there are also cases where a sound insulation sheet (silencer) is applied to a vehicle cab side surface, surrounding a wire harness through-hole of a vehicle body panel. Any of the sound insulation solutions for a vehicle cab interior described above is effective; however, even better vehicle cab sound insulation has been sought, and in this regard there is room for improvement of a grommet.

RELATED ART

Patent Literature

Related Art 1: Japanese Patent Laid-open Publication No. 2001-309528

SUMMARY OF THE INVENTION

Problems to Be Solved by the Invention

The present invention has been conceived in view of the above-described problems, and has as its object to provide a grommet with high sound insulation ability toward a vehicle cab interior.

Means for Solving the Problems

In order to resolve the above-described situation, the present invention provides a grommet for a vehicle which includes a first grommet and a second grommet each positioned in contact with one of a vehicle body panel's two surfaces on which a wire harness through-hole is bored, the first grommet and the second grommet each being integrally formed from rubber or an elastomer with a small diameter tubular portion, to which a wire harness is adhered, then inserted and fixated by tape-winding, and with a large diameter tubular portion extending from one end of the small diameter tubular portion. An end surface of a forefront open side on each large diameter tubular portion of the first and second grommets is positioned in contact with one of the two surfaces of the vehicle body panel, a first side portion of a stud bolt fixatedly inserted into a bolt hole bored in the peripheral rim of the wire harness through-hole on the vehicle body panel and protruding from both surfaces of the vehicle body panel passes through a bolt hole provided on the first grommet and is fixated by a nut and, a second side portion of the stud bolt passes through a bolt press-fitting hole provided on the second grommet to support the second grommet, and the bolt press-fitting hole having a smaller diameter than the stud bolt is provided on an inclined wall portion of the large diameter tubular portion of the second grommet, and the bolt press-fitting hole is provided non-parallel to an axial direction of the stud bolt.

The grommet of the present invention positions the first grommet on an exterior side of the vehicle cab on the engine compartment side, which is above the horizontal vehicle body panel, to serve as a grommet for waterproofing/debris-proofing, and positions the second grommet on an interior side of the vehicle cab, which is below the vehicle body panel, to serve as a grommet for sound insulation.

As described above, in the grommet of the present invention, one side portion of the stud bolt is passed into the bolt hole provided on the first grommet and fixated with the nut, whereas the bolt press-fitting hole having a smaller diameter than the stud bolt is provided on the large diameter tubular portion of the second grommet and the other side portion of the stud bolt is press-fitted into and fixated in the bolt press-fitting hole.

Specifically, the wire harness is passed into the small diameter tubular portion of the first grommet and fixated by tape-winding and, in addition, the wire harness is passed into the small diameter tubular portion of the second grommet and fixated by tape-winding. Further, the one side portion of the stud bolt is passed into the bolt hole of the first grommet and fastened with the nut. That is, the first and second grommets are attached to the wire harness in a state in which the forefront openings of their respective large diameter tubular portions are opposed. In this way, in a state where the first and second grommets and the stud bolt are attached to the wire harness, the wire harness is routed in the automobile, the entire body of the second grommet is inserted in a downward orientation from above into the wire harness through-hole on the horizontal vehicle body panel, then is pulled into the vehicle cab interior. Next, the end surface of the large diameter tubular portion of the first grommet is placed in contact with the exterior surface of the vehicle cab (surface on the engine compartment side) on an upper surface of the vehicle body panel and, after the stud bolt is passed into the bolt hole on the vehicle body panel, the stud bolt is fastened with the nut and the first grommet is fixated to the exterior surface of the vehicle cab on the vehicle body panel. Next, the end side of the large diameter tubular portion of the second grommet is folded back toward a lower side on the small diameter tubular portion side, exposing the other end side of the stud bolt, and the stud bolt is press-fitted into the bolt press-fitting hole provided on the large diameter tubular portion to support the second grommet with the stud bolt. Finally, the end side of the large diameter tubular portion of the second grommet which was folded back is returned to its original upward shape and the end side surface thereof is placed into contact with the interior surface on the vehicle cab of the vehicle body panel.

The grommet of the present invention for a vehicle, configured from the first and second grommets, fixates the second grommet to the wire harness by tape-winding; in addition, the stud bolt attached to the vehicle body panel is press-fitted into the bolt press-fitting hole provided on the second grommet; thereby, it is possible to support the second grommet with the stud bolt and, thus, the second grommet can be prevented from sagging below the vehicle or falling out due to its own weight or the weight of the harness inserted in its interior, and it is possible to effectively prevent the open end on the large diameter side of the second grommet from rising off of the vehicle body panel surface. Further, the bolt press-fitting hole formed on the second grommet has a smaller diameter than the stud bolt; thus, the outer peripheral surface of the stud bolt can adhere reliably to the inner peripheral surface of the bolt press-fitting hole, and it is possible to support the second grommet with the stud bolt. In this way, the adhesion and mounting stability of the second grommet with the vehicle body panel can be improved; thus, it is possible to effectively prevent gaps from developing between the second grommet and the vehicle body panel surface, and moreover, because the bolt press-fitting hole on the second grommet and the stud bolt adhere to one another and gaps do not develop, it is possible to increase the sound insulation performance of the second grommet.

Further, the first grommet is fixated by bolt-fastening to the vehicle body panel; thus, the adhesion and mounting stability of the first grommet with the vehicle body panel are high, and it is possible to provide excellent water-blocking and debris-blocking performance. Moreover, the stud bolt, which supports the second grommet, is provided by projecting the stud bolt for fixating the first grommet on the vehicle body panel onto the other side surface of the vehicle body panel; thus, there is no need to attach another stud bolt for supporting the second grommet and an increase in the number of parts can be prevented. Yet further, the stud bolt is inserted into the bolt press-fitting hole of the second grommet; thus, the stud bolt attachment state can be verified visually from the exterior.

As described above, the bolt press-fitting hole having a smaller diameter than the stud bolt is provided on an inclined wall portion of the large diameter tubular portion of the second grommet, and that the bolt press-fitting hole be provided non-parallel to the axial direction of the stud bolt. In this way, by providing the bolt press-fitting hole into which the stud bolt is press-fitted on the inclined wall portion of the second grommet, and by providing the bolt press-fitting hole non-parallel to the axial direction of the stud bolt, the bolt press-fitting hole which has temporarily become parallel to the axial direction of the stud bolt during press-fitting of the stud bolt attempts to return to a non-parallel direction which is the true insertion direction due to the elasticity of the second grommet; thus, due to this elastic restoration force, it is possible to increase engagement of the bolt press-fitting hole on the stud bolt, and to make the support of the second grommet by the stud bolt even more reliable and stable.

Moreover, it is preferred that the inner diameter of the open end of the large diameter tubular portion of the second grommet be made larger than the inner diameter of the open end of the large diameter tubular portion of the first grommet, and that a flange portion be provided having a sealing lip portion, which adheres to the vehicle body panel, projecting from the peripheral edge of the open end of the large diameter tubular portions of the first and second grommets. With the above-described configuration, it is possible to make the first grommet excellent in water-blocking/debris-blocking and, in addition, noise from outside the vehicle cab, such as from the engine compartment, can be prevented from intruding on the vehicle cab interior through the through-hole. Further, with the second grommet, noise from outside the vehicle cab can be sealed within the second grommet, and noise to the vehicle cab interior can be reduced.

Effect of the Invention

As described above, for the grommet of the present invention, the first grommet and the second grommet are oppositely attached to the wire harness, and the first and second grommets are placed in contact with the vehicle cab interior surface side and with the vehicle cab exterior surface side of the vehicle body panel; thus, it is possible to achieve water-blockage/debris-blockage and sound insulation functionality to the vehicle cab interior.

In particular, the second grommet, which is used for sound insulation, is not only fixated by tape-winding to the wire harness, but a stud bolt attached to the first grommet and to the vehicle body panel and also press-fitted into a bolt press-fitting hole provided on the second grommet to support the second grommet with the stud bolt. Accordingly, even when the second grommet is positioned in a downward orientation on a lower surface of the vehicle body panel, sagging downward and falling off of the vehicle body panel due to the second grommet's own weight or the weight of the wire harness can be prevented, and the mounting stability and adhesion of the second grommet with the vehicle body panel can be improved. Further, because the bolt press-fitting hole on the second grommet has a smaller diameter than the stud bolt, it is possible to make the inner peripheral surface of the bolt press-fitting hole adhere to the outer peripheral surface of the stud bolt. Thereby, the occurrence of gaps between the vehicle body panel, the stud bolt, and the second grommet can be effectively prevented, and the sound insulation performance of the second grommet can be improved.

Moreover, by making the insertion direction of the bolt press-fitting hole non-parallel to the axial direction of the stud bolt, the bolt press-fitting hole which has become parallel to the axial direction of the stud bolt by insertion of the stud bolt attempts to return to the non-parallel direction due to the elasticity of the second grommet; thus, due to the action of the elastic restoration force, it is possible to strengthen the engagement of the bolt press-fitting hole on the stud bolt, and to make the support of the second grommet by the stud bolt even more reliable.

MODE FOR CARRYING OUT THE INVENTION

Hereafter, an embodiment of the present invention will be explained with reference to the drawings. FIGS. 1-4 show a grommet 10 according to the embodiment of the present invention. The grommet 10 is externally fitted to a wire harness 30 inserted in a wire harness through-hole H (hereafter, abbreviated as through-hole H) bored in a vehicle body panel (dashboard panel) P separating an engine compartment side (vehicle cab exterior side) X and a vehicle cab interior side Y in an automobile, and is mounted on a peripheral edge of the through-hole H. The vehicle cab exterior side X on the engine compartment side is above the vehicle body panel P, which is positioned in a horizontal direction, and the vehicle cab interior side Y is below.

The grommet 10 is configured from a first grommet 11 positioned on the upper, vehicle cab exterior side X, and which chiefly assumes water-blocking and debris-blocking functions, and from a second grommet 21 positioned on the lower, vehicle cab interior side Y, and which assumes a sound insulation function. The first grommet 11 and the second grommet 21 are separate bodies, each integrally formed of rubber or an elastomer.

Figure 1:
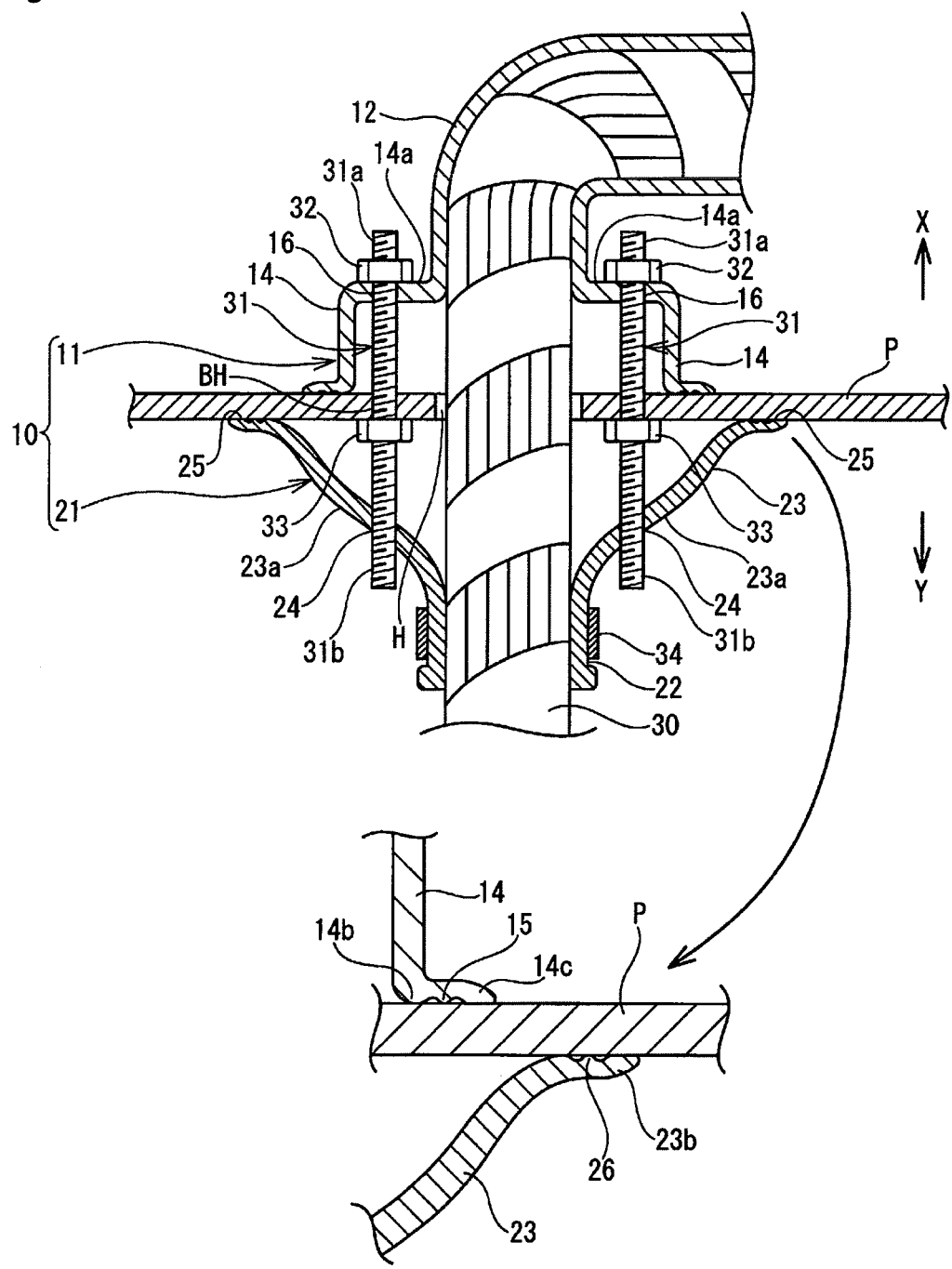
FIG. 1 is an explanatory cross-sectional view illustrating a state in which a grommet according to a first embodiment of the present invention is mounted to a vehicle body panel.

The first grommet 11, as shown in FIG. 1, includes a small diameter tubular portion 12 to which the wire harness 30 is adhered and inserted and a large diameter tubular portion 14 which extends from one end of the small diameter tubular portion 12. The large diameter tubular portion 14 includes an annular closed end portion 14a continuing to the small diameter tubular portion 12 and a flange portion 14c projecting from an outer periphery of an open end 14b of the forefront and having a sealing lip portion 15 that adheres to an upper surface of the vehicle body panel P. The closed end portion 14a includes four bolt holes 16 at equal distances in a peripheral direction. A stud bolt 31 is inserted into each of the bolt holes 16 and fixated by a nut 32. In this state, one side portion (i.e., a first portion 31fp of the stud bolt 31) that includes an upper portion 31a of the stud bolt 31 passes through an interior of the first grommet 11 and the other side portion (i.e., a second portion 31sp of the stud bolt 31) that includes a lower portion 31b of the stud bolt 31 projects down from the open end 14b of the forefront of the large diameter tubular portion 14.

Figure 2:
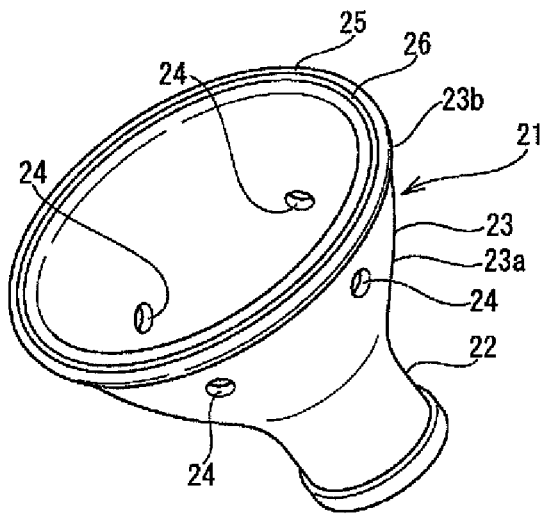
FIG. 2 is a perspective view of a second grommet.

The second grommet 21 is configured from a small diameter tubular portion 22 to which the wire harness 30 is adhered and inserted, and a large diameter tubular portion 23 in which the diameter expands via an inclined wall portion 23a from one end of the small diameter tubular portion 22. As shown in FIG. 2, four bolt press-fitting holes 24 are punched at equal distances in a peripheral direction on the inclined wall portion 23a of the large diameter tubular portion 23. A flange portion 23b is provided in which a sealing lip portion 26, adhering to a lower surface of the vehicle body panel P, also projects from an outer peripheral edge of a large diameter-side open end 25 of the large diameter tubular portion 23 of the second grommet 21. The inner diameter of the forefront-side opening of the large diameter tubular portion 23 of the second grommet, as shown in FIG. 1, is made larger than the inner diameter of the forefront-side opening of the large diameter tubular portion 14 of the first grommet 11.

Figure 3:
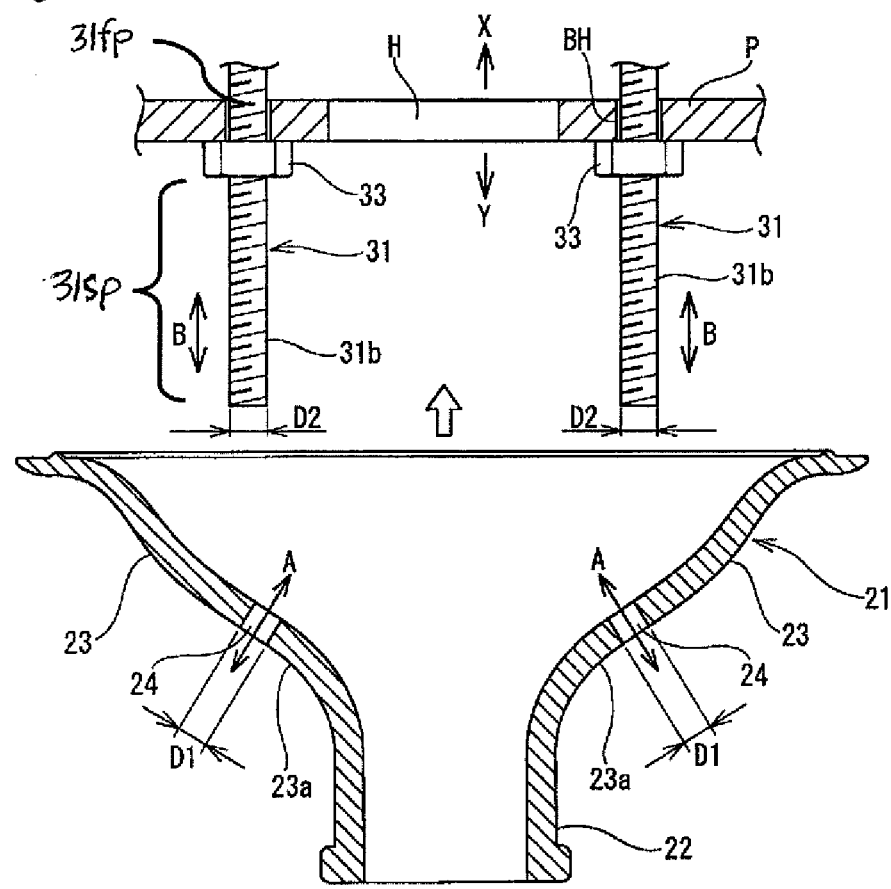
FIG. 3 is a cross-sectional view of the second grommet.

An inner diameter D1 of a bolt press-fitting hole 24 provided on the second grommet 21, as shown in FIG. 3, is made to have a smaller diameter than an outer diameter D2 of the lower projecting portion 31b of the stud bolt 31. Further, an insertion direction A of the bolt press-fitting hole 24 is made to be a thickness direction of the inclined wall portion 23a, and is made to be non-parallel to an axial direction B of the stud bolt 31 attached to the vehicle body panel P.

For the grommet 10 of the above-described configuration, as shown in FIG. 1, the stud bolt 31, which is fastened and fixated in advance to the first grommet 11 by the nut 32, is passed into one of bolt holes BH provided at equal distances in a peripheral direction on the peripheral edge of the through-hole H of the vehicle body panel P, and fastened by a nut 33 to fixate the first grommet 11 to an upper surface of the vehicle body panel P. Further, the lower projecting portion 31b of the stud bolt 31 is inserted through the through-hole H of the vehicle body panel P and press-fitted into the bolt press-fitting hole 24 of the second grommet 21 positioned below to support the second grommet 21.

Figure 4A:
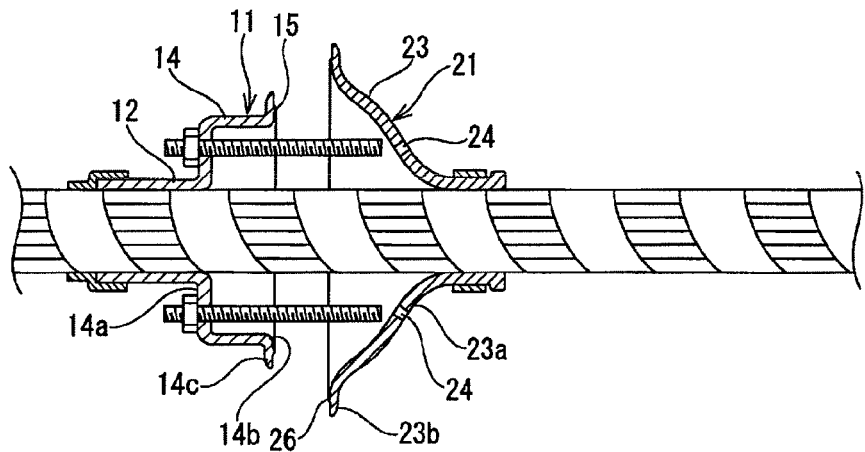
FIGS. 4A-4D illustrate a procedure for fixating a wire harness to the vehicle body panel.

Specifically, at the time of assembling the wire harness 30, the wire harness 30 is passed into the small diameter tubular portion 12 of the first grommet 11 and fixated by tape-winding and, in addition, the wire harness 30 is passed into the small diameter tubular portion 22 of the second grommet 21 and fixated by tape-winding. Further, as shown in FIG. 4A, one side portion of the stud bolt 31 is passed into the bolt hole 16 of the first grommet 11 and fastened with the nut 32. That is, the first grommet 11 and second grommet 21 are attached to the wire harness 30 in a state in which the forefront openings of their respective large diameter tubular portions 14 and 23 are opposed, and the stud bolt 31 is attached to the first grommet 11.

Figure 4B:
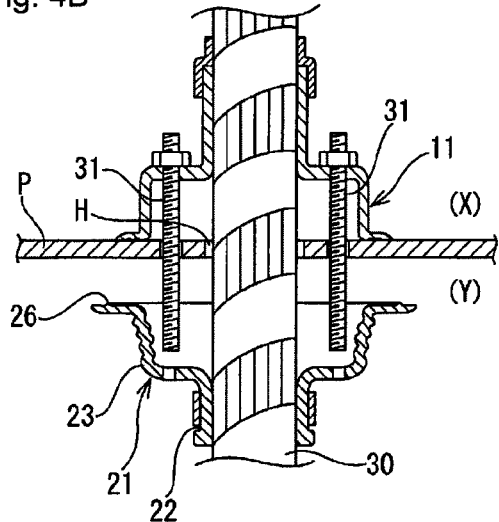

In this way, the wire harness 30 is routed in the automobile on an automobile assembly line in a state where the first grommet 11, the second grommet 21, and the stud bolt 31 are attached to the wire harness 30. As shown in FIG. 4B, the wire harness 30 is passed in a downward orientation from above into the through-hole H of the horizontal vehicle body panel P which separates the engine compartment and the vehicle cab interior, and the entire body of the second grommet 21 is inserted through the through-hole H, then pulled out on the vehicle cab interior side Y below the vehicle body panel P. In this state, the flange portion 14c of the large diameter tubular portion 14 of the first grommet 11 is placed in contact with the exterior surface of the vehicle cab (engine compartment-side surface) on the upper surface of the vehicle body panel P; then, after being passed into the bolt hole BH of the vehicle body panel P, the stud bolt 31 is fastened with the nut 33, and the first grommet 11 is fixated on the exterior surface of the vehicle cab on the upper surface of the vehicle body panel P.

Figure 4C:
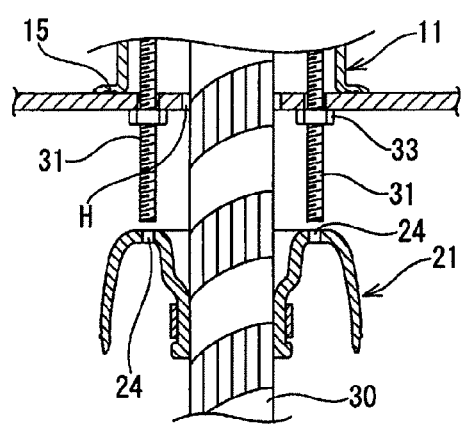
Figure 4D:
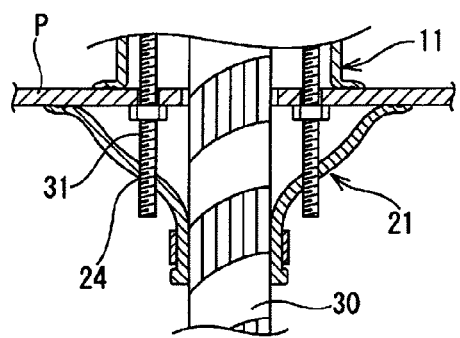
Figure 5:
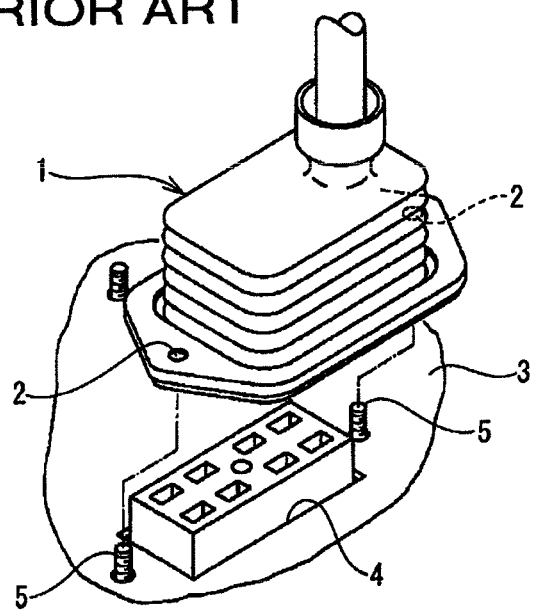
FIG. 5 is a partial, fractured view illustrating an attachment structure of a conventional grommet with a vehicle body panel.

Next, the forefront side of the large diameter tubular portion 23 of the second grommet 21, as shown in FIG. 4C, is folded back toward a lower side on the small diameter tubular portion 22 side, and the lower projecting portion 31b of the stud bolt 31, which projects downward from the vehicle body panel P, is exposed to the exterior. In this state, while verifying the position of the stud bolt 31, the lower projecting portion 31b of the stud bolt 31 is press-fitted into the bolt press-fitting hole 24 provided on the second grommet 21. After press-fitting, as shown in FIG. 4D, the forefront side of the large diameter tubular portion 23 of the second grommet 21 which has been folded back to a lower side returns to its original upward state, and the forefront-side surface thereof is placed in contact with the lower surface of the interior surface of the vehicle cab on the vehicle body panel P.

The second grommet 21 positioned on a lower surface of the vehicle body panel P is wrapped with a tape 34 on the external circumference of the small diameter tubular portion 22 thereof, and its position is fixated with respect to the wire harness 30, which has been inserted in the interior of the small diameter tubular portion 22. In addition, the lower projecting portions 31b of four stud bolts 31 are press-fitted into four bolt press-fitting holes 24 formed on the second grommet 21 to be supported; thus, it is possible to adhere and attach the sealing lip portion 26 of the second grommet 21 to the lower surface of the vehicle body panel P.

For the grommet 10 of the above-described configuration, on the vehicle cab exterior side X above the vehicle body panel P, the first grommet 11 is fixated firmly to the vehicle body panel P by the stud bolt 31 and the nuts 32 and 33, and the sealing lip portion 15 is adhered reliably to the upper surface of the vehicle body panel P; thereby, superior water-blocking/debris-blocking performance can be provided. Meanwhile, on the vehicle cab interior side Y below the vehicle body panel P, the stud bolt 31 is press-fitted into the bolt press-fitting hole 24 of the second grommet 21 and supports the second grommet 21; thus, sagging and falling of the second grommet 21 can be effectively prevented, and the sealing lip portion 26 on the upper end of the second grommet 21 can be adhered reliably to the lower surface of the vehicle body panel P, and sound insulation performance can be increased.

Further, the inner diameter D1 of the bolt press-fitting hole 24 is made to have a smaller diameter than the outer diameter D2 of the lower projecting portion 31*b* of the stud bolt 31; thereby, gaps do not develop between the outer peripheral surface of the lower projecting portion 31*b* and the inner peripheral surface of the bolt press-fitting hole 24, and it is possible to adhere one to another; thus, sound can be effectively prevented from leaking to the vehicle cab interior side Y through the bolt press-fitting hole 24.

Moreover, as shown in FIG. 3, by making the insertion direction A of the bolt press-fitting hole 24 non-parallel with respect to the axial direction B of the stud bolt 31, the bolt press-fitting hole 24 which has become the same direction as the axial direction B of the stud bolt 31 by inserting the stud bolt 31 into the bolt press-fitting hole 24 attempts to restore the inherent insertion direction A using its rubber elasticity. Thereby, a powerful engagement force of the bolt press-fitting hole 24 is generated on the stud bolt 31; thus, the support of the second grommet 21 by the stud bolt 31 is also stable, and the adhesion state of the large diameter-side open end 25 of the second grommet 21 and the vehicle body panel P can be further stabilized.

Moreover, each stud bolt 31 is attached to the first grommet 11 ahead of time, and the stud bolts 31 are passed into the bolt holes of the vehicle body panel P and used as support for the second grommet 21; thus, there is no need to attach separate bolts as support for the second grommet 21, and an increase in the number of components can be inhibited.

Furthermore, the grommet of the present invention is not limited to the above-described embodiment: the open end surface may be placed in contact with the lower surface of the vehicle body panel, without providing the flange portion having the sealing lip portion projecting from the open end surface of the top end of the second grommet. Moreover, the inner diameters may be the same for the open ends of the first grommet and the second grommet in contact with both surfaces of the vehicle body panel.

DESCRIPTION OF REFERENCE NUMERALS

10 grommet
11 first grommet
14 large diameter tubular portion
16 bolt hole
21 second grommet
23 large diameter tubular portion
24 bolt press-fitting hole
30 wire harness
31 stud bolt
P vehicle body panel
H through-hole
BH bolt hole

The invention claimed is:

1. A grommet assembly for a vehicle, comprising:
a first grommet and a second grommet each positioned in contact with one of two surfaces of a vehicle body panel having a wire harness through-hole,
the wire harness through-hole configured to allow insertion of a wire harness,
the first grommet and the second grommet each being integrally formed from one of rubber and an elastomer with a small diameter tubular portion that is configured to allow insertion of the wire harness and with a large diameter tubular portion extending from one end of the small diameter tubular portion, wherein
an end surface of a forefront open side on each large diameter tubular portion of the first or second grommet is positioned in contact with one of the two surfaces of the vehicle body panel,
a first portion of a stud bolt fixedly inserted into a first bolt hole provided in a peripheral rim of a portion of the vehicle body panel that surrounds the wire harness through-hole, the stud bolt protruding from both surfaces of the vehicle body panel such that the first portion of the stud bolt passes through a second bolt hole provided on the first grommet and is fixated by a nut, and a second portion of the stud bolt passes through a third bolt hole defined by a bolt press-fitting hole provided on the second grommet to support the second grommet,
the bolt press-fitting hole having a smaller diameter than the stud bolt, and being provided on an inclined wall portion of the large diameter tubular portion of the second grommet, and the bolt press-fitting hole being provided non-parallel to an axial direction of the stud bolt.

2. The grommet assembly according to claim 1, wherein the first grommet is positioned on an exterior side of a vehicle cab on an engine compartment side, which is above the horizontal vehicle body panel, to serve as a grommet for water and dust protection, and the second grommet is positioned on an interior side of the vehicle cab, which is below the vehicle body panel, to serve as a grommet for sound insulation.

3. The grommet assembly according to claim 2, wherein an inner diameter of the open end of the large diameter tubular portion of the second grommet is larger than an inner diameter of the open end of the large diameter tubular portion of the first grommet, and a flange portion is provided having a sealing lip portion, which adheres to the vehicle body panel, projecting from the peripheral edge of the open end of the large diameter tubular portions of the first and second grommets.

4. The grommet assembly according to claim 1, wherein an inner diameter of the open end of the large diameter tubular portion of the second grommet is larger than an inner diameter of the open end of the large diameter tubular portion of the first grommet, and a flange portion is provided having a sealing lip portion, which adheres to the vehicle body panel, projecting from the peripheral edge of the open end of the large diameter tubular portions of the first and second grommets.

* * * * *